Anton Heinig
Kurt Lasch
Werner Weck
INVENTORS.

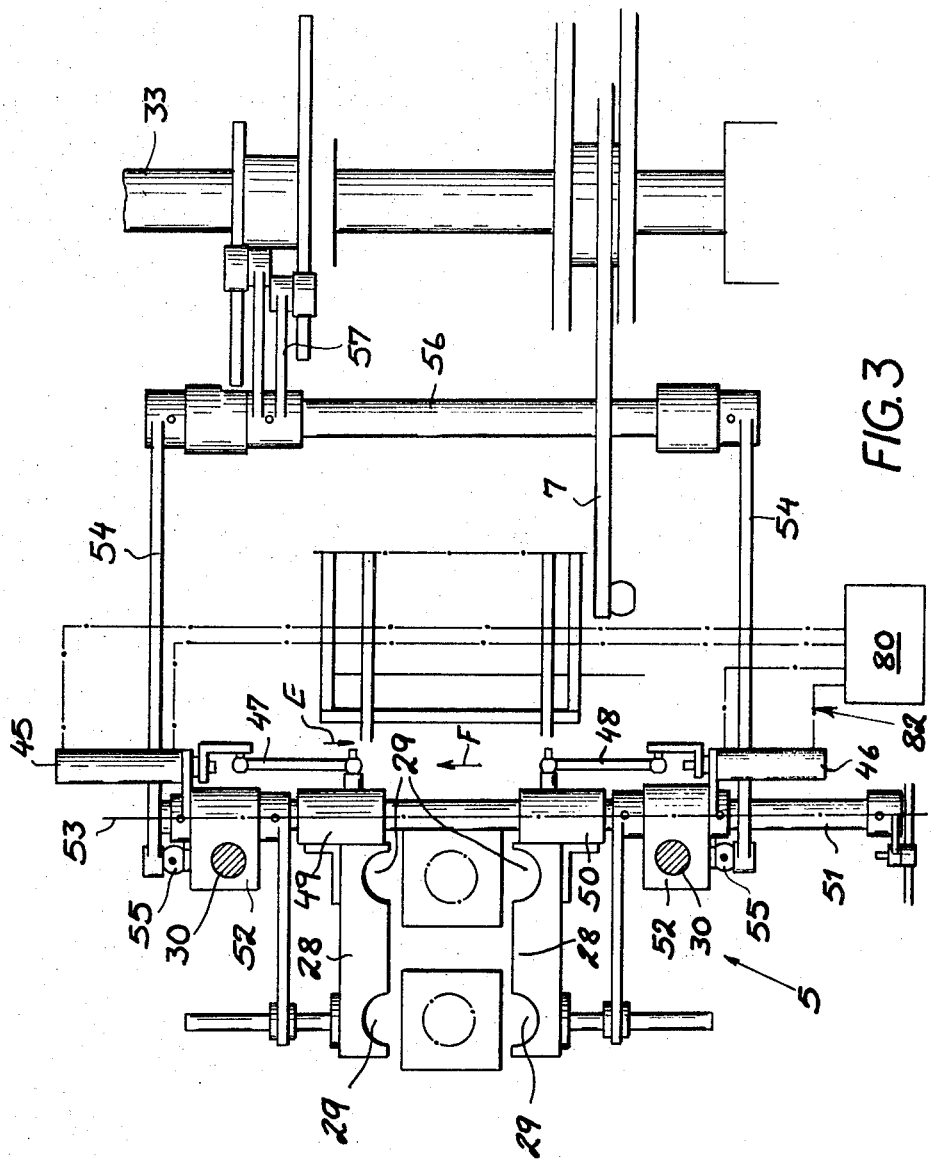

BY

Karl J. Ross
Attorney

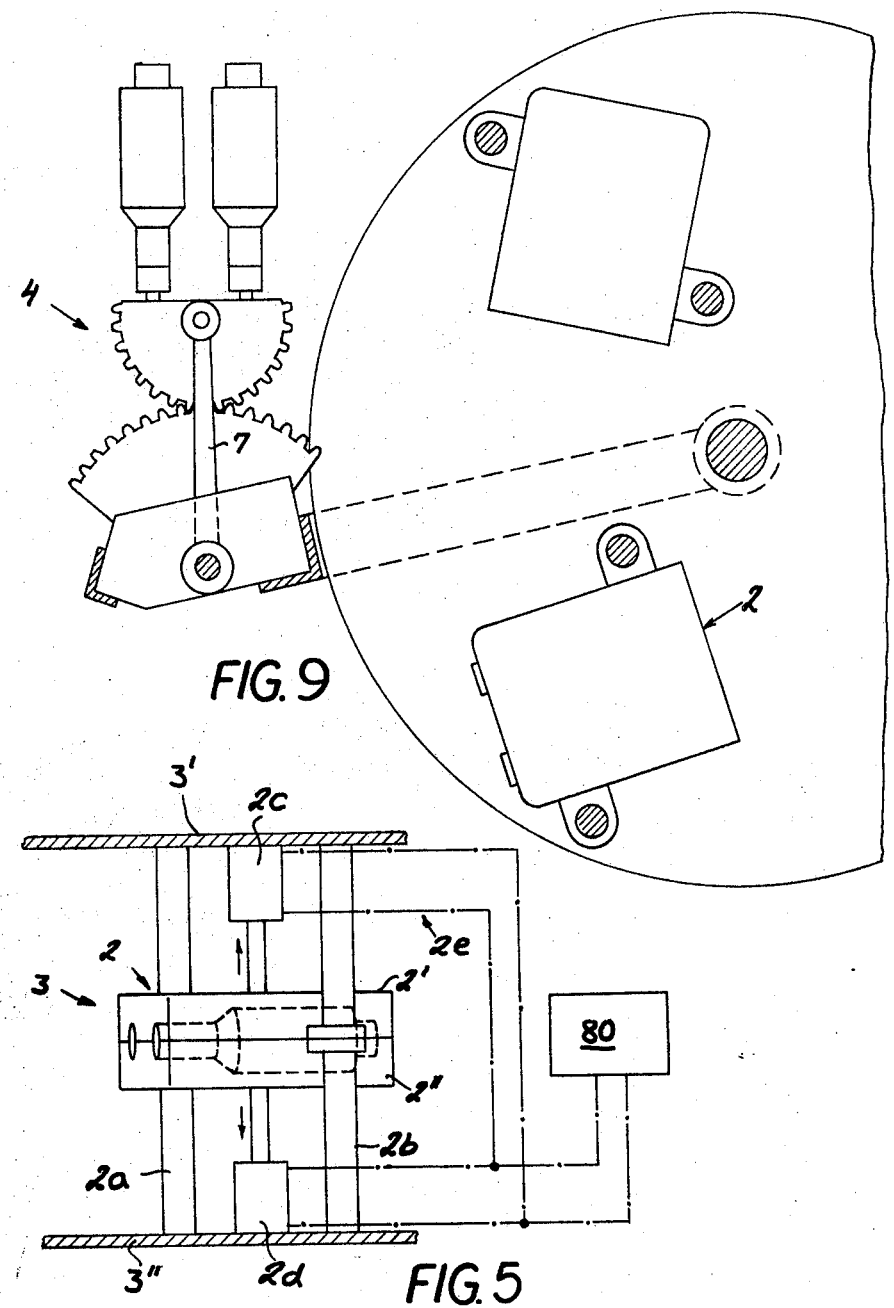

United States Patent Office 3,570,058
Patented Mar. 16, 1971

3,570,058
APPARATUS FOR THE REMOVAL AND TRANSPORTATION OF BLOW-MOLDED ARTICLES
Anton Heinig, Wuppertal-Barmen, Kurt Lasch, Hilgen, near Burscheid, and Werner Weck, Schwelm, Westphalia, Germany, assignors to Firma Heinig & Leonhardt, Remscheid-Luttringhausen, Germany
Filed Jan. 13, 1969, Ser. No. 790,576
Claims priority, application Germany, Jan. 12, 1968,
P 15 56 570.5
Int. Cl. B29d 23/03
U.S. Cl. 18—5                    12 Claims

ABSTRACT OF THE DISCLOSURE

An apparatus for the removal of blow-molded articles from a plurality of molds mounted upon a turntable which has a pickup head provided with a barbed pin adapted to lodge in a head of the blow-molded article. The pickup head is swingably mounted on an arm centered on the axis of rotation of the turntable and is entrained therewith so that the turntable need not be halted during the removal operation. A gear sector on the head cooperates with a further gear sector to swing the head about its axis and deliver the articles to a gripper which strips them from the head and advances them to a transport mechanism carrying the articles away from the turntable.

---

Our present invention relates to an apparatus for the removal and transportation of blow-molded articles and, more particularly, to an apparatus for this purpose adapted to operate in conjunction with a continuously driven mold-carrying turntable of an installation for the manufacture of blow-molded hollow articles, especially flasks, bottles and the like.

The mass production of hollow articles and especially receptacles such as jars, flasks, bottles and like packaging containers has, to a large measure, developed from the blow-molding art wherein a strip of plastically deformable synthetic resin (usually from an extrusion press) is clamped between the two halves of a separable mold which is then closed and the synthetic resin urged against the walls of the mold to define the hollow article by air pressure.

The molds may be carried in angularly spaced relationship, upon a turntable, turret or other rotary member for displacement from the blow-molding station to a mold-emptying station and subsequent return to the blow-molding station for a repetition of the cycle.

Earlier systems for discharging such articles from the molds of a turntable have provided grippers adapted to engage the articles upon opening of the mold and have entailed a halt in the rotation of the mold to enable the mold-emptying apparatus to clear. Consequently, only intermittent operation of the turntable was possible and the entire production was limited by the period of time in which the mold was stationary. Furthermore, control of the intermittent movement of the turntable required complex programming and stepping systems which often broke down and further limited the overall capacity of the installation.

It is, therefore, the principal object of the present invention to provide an improved apparatus for the emptying of the molds of a blow-molding installation provided with a mold-carrying turntable of the character described and which obviates the aforementioned disadvantages.

Another object of this invention is the provision, in combination with a continuously operating mold-carrying turntable, of an apparatus for the removal and transportation of hollow blow-molded articles, especially containers, and their delivery to a transport mechanism capable of carrying the individual articles to stations for filling, labeling or further processing.

A further object of our invention is the provision of an improved continuously operable mold-emptying apparatus of relatively simple and easily controlled construction and low capital cost.

Yet a further object of the instant invention is the provision of an apparatus of the character described which effectively and rapidly can discharge hollow articles, such as bottles, jars, flasks and other containers from a rotary mold-carrying turntable and order them effectively for further processing.

These objects and others which will become apparent hereinafter are attained, in accordance with the present invention, by the provision of a continuously driven turntable forming part of a blow-molding installation and carrying a plurality of openable molds adapted to form respective synthetic-resin articles upon the introduction of synthetic-resin materials into the molds, the synthetic-resin materials being preferably in the form of a plastic strip derived from an extrusion press and inflated against the walls of the mold while the latter are in their closed positions. The article removal and transport apparatus of this invention has a pickup head engageable with one or more articles of the successive molds upon their entrainment by the turntable past a mold-emptying station, the turntable carrying the molds continuously (i.e. without interruption of the rotation) from a blow-molding station at which the articles are formed in a continuous manner not further discussed since it is part of the literature and outside the scope of the present invention. After passing through the mold-emptying station, at which each mold is opened for removal of the article or articles formed therein, the molds are closed and carried in succession back to the molding station to complete the cycle.

According to the instant invention, mounting means support the pickup head for movement in the sense of rotation of the turntable and at the end of the angular velocity of rotation thereof over at least a limited angular stroke corresponding to the passage of each mold through the mold-emptying station, so that the pickup head can seize the articles and withdraw them from the molds for deposition at a transport means. A mechanism, including the head, shifts the articles engaged thereby out of the molds and transfers them to the transport means for further displacement of the articles.

According to a more specific feature of this invention, the mounting means for the pickup head includes an arm swingable about an axis located outwardly of the periphery of the circular path of the molds on the turntable, this axis in turn being angularly displaceable about the axis of rotation of the turntable together with the latter. To this end, the arm carrying the pickup head may be swingably mounted on a follower arm which is journaled for rotation about the axis of the turntable and has an angular stroke defining the extent of entrainment of the pickup head with each mold. This arrangement ensures that, with a continuous drive, the hollow blow-molded bodies, bottles, etc., can be swung out of the path of the molds in the cadence of the advance of each mold to the mold-emptying station and return in time to catch the subsequent mold. We have found that it is important to mount the pickup head rotatably at the free end of the head-carrying arm and provide means for swinging the head and the article carried thereby about an axis parallel to the axis of the turntable, preferably through about 180°, in order to deliver the articles to the transport and gripping mechanism at a location remote from the turntable. The means for rotating the head out of the path of the mold and returning the head to a position in which it can engage a further article during the next mold-emptying cycle, includes a toothed (gear) segment centered on the axis of swing of the head-carrying arm and meshing with a toothed sector affixed to the pickup head. Thus the swing of the latter arm automatically rotates the head between a position in which the article-engaging members thereof face the molds and a position in which they face away from the molds toward the transport means.

Upon removal of the articles and their delivery to the transport mechanism, the arm returns the pickup head to the mold-emptying station at its initial position for engagement with the next article. The molds preferably open just before the end of the joint movement of the pickup head and the mold at the end of the mold path through the mold-emptying station to allow the articles to clear.

According to a feature of this invention, the pickup head is provided with one or more anchor pins, adapted to be driven into the "lost head" of the article as the pickup head meets each article in a closed mold at the starting point of the mold-emptying path. The pins, which may be provided with barbs adapted to anchor the articles to the pins, are retractable to dislodge the articles at a gripping mechanism adapted to strip the articles from the pins and deliver them to the transport mechanism. The term "lost head" is used herein to refer to a nonhollow mass integrally formed with the hollow article at one end thereof during the molding process, the pin being longitudinally shiftable in its head and preferably being resiliently mounted therein.

The pickup head of the present invention, therefore, may include a fluid-pressure-responsive piston-and-cylinder arrangement for displacement of the retractable anchor pins. To this end, the piston of the double-acting cylinder is held stationary on the pickup head while the axially movable cylinder entrains the anchor pins which preferably extend through a support plate in which these pins are guided. Springs are disposed between the pins and their entrainment plate while the guide and support plate is formed with a guide sleeve extending beyond the wall of this latter plate to the region of the barbed end of the anchor pin to provide additional support for the articles as they are swung out of the molds and toward the gripper and gripper means. The ends of the sleeves proximal to the barbs of the anchor pins have an outwardly divergent conical configuration to augment the forces entering the pins to the articles.

The gripping or stripper means, according to the present invention, comprises a pair of gripper jaws movable transversely to the anchor pins in an extreme limiting position of the pickup head remote from the mold-emptying station and wherein the pickup head has been rotated about its axis with respect to its support arm through 180°, these jaws having the configuration of the article at least at the heads in which the pins are received. Retraction of the pins dislodges the barbs from the articles which, while gripped between the jaws, are advanced to the transport mechanism. The latter has a plurality of pockets at a spacing corresponding to the spacing in which the articles are retained by the jaws. The transport means can include a continuous band, chain or belt carrying these pockets and stepped by a cam shaft or programming mechanism in synchronism with the turntable, the pickup head and the gripper means.

The above and other objects, features and advantages of the present invention will become more readily apparent from the following description, reference being made to the accompanying drawing in which:

FIG. 3 is a plan view of the gripper mechanism taken generally in the direction of arrow III in FIG. 1;

FIG. 5 is a view generally in the direction of arrow V in FIG. 1 showing the mold in somewhat greater detail;

FIG. 6 is a cross-sectional detail view of the end of the anchor pin upon its engagement with the article; and FIGS. 7, 8 and 9 are fragmentary views similar to FIG. 1, showing the interrelationship of the turntable and pickup head in various operative positions, according to the present invention.

Figure 1:
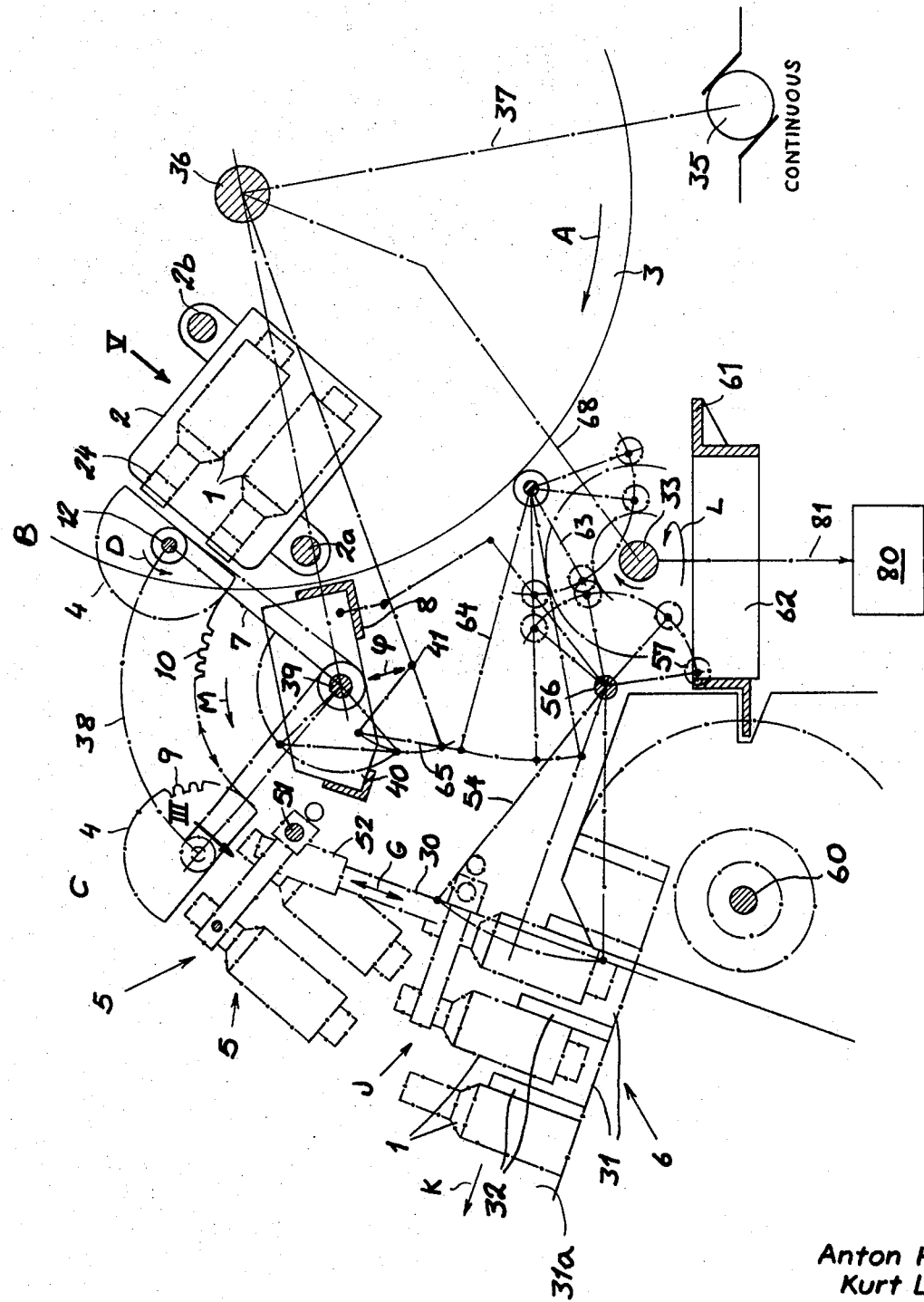
FIG. 1 is a side-elevational view of the mold-emptying station of a blow-molding plant embodying the present invention with various elements thereof shown in the extreme operating positions and with parts broken away.
Figure 2:
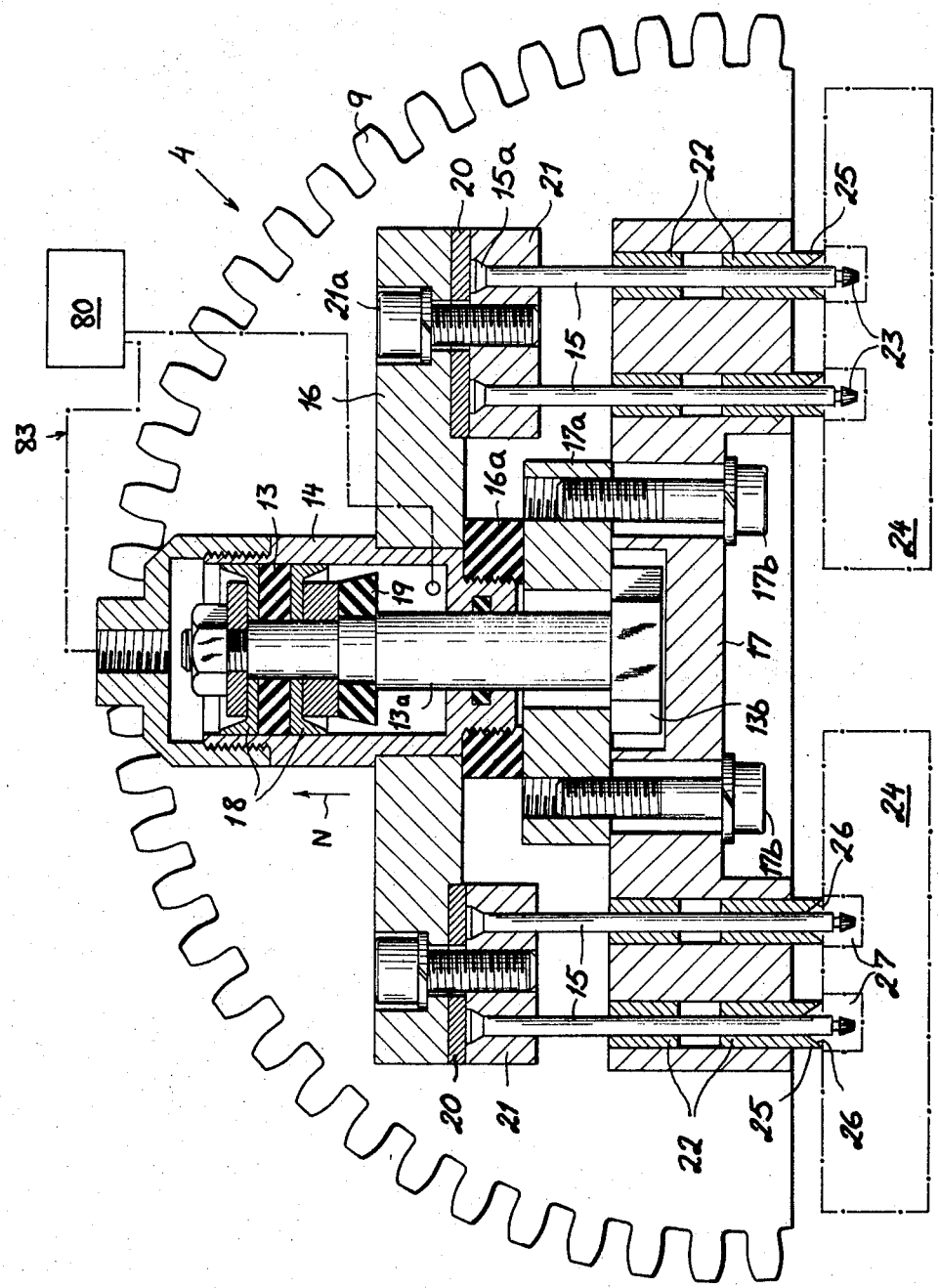
FIG. 2 is a vertical section through a pickup head of the type diagrammatically shown in FIG. 1.

In FIG. 1, we have shown a system in which hollow plastic articles, especially blow-molded bottles and like containers, are formed as represented at 1 in openable molds 2 spaced about a turret or turntable 3. The articles may be formed at a location along the path of this turret which is rotated continuously in the direction of arrow A by a motor 35 connected to the turntable shaft 36 by a transmission represented at 37, this location being unillustrated and having a blow-molding assembly for introducing a plastic strip into the mold and then expanding the strip by air pressure within the mold to produce the articles. The articles have, as can be seen in FIGS. 1 and 2, lost heads 24 adapted to be severed from the bottle in a subsequent treatment and constituting a solid plastic body into which the anchor pins can be driven to enable the articles to be removed from the mold.

The mold-emptying apparatus comprises a pickup head which is generally represented at 4 in FIG. 1, but can be seen in greater detail in FIGS. 2, 4 and 6–9, the pickup head carrying the articles to a gripper means represented at 5 whereby the articles 1 are stripped from the anchor pins and the pickup head is permitted to return to its starting position. The gripper means 5 advances the article 1 to a transport mechanism generally represented at 6.

The pickup head 4 is swingably mounted, via a shaft 12 parallel to the turntable shaft 11, on an arm 7 which is diagrammatically represented in FIG. 1 but is shown in somewhat more detail in FIGS. 3 and 7–9. The arm 7 defines an arcuate path for the pickup head 4 as represented by the dot-dash line 38 between an extreme position B wherein the pickup head engages the articles and a position C in which the articles are dislodged. The arm 7 is, in turn, swingably mounted about a shaft 39 on a frame 40 carried by a further arm 8 (FIGS. 1 and 7) whose center of swing coincides with the axis of the turntable shaft 11 and can extend over an angle $\varphi$ through which the arm is entrained by the turntable between a lower extreme position 41 and an upper extreme position corresponding substantially to that shown in FIG. 8. As indicated, the arm 7 thereafter is swung away from the turntable.

As can be seen from FIGS. 2 and 7–9, the pickup head 4 is provided with a gear sector 9 toothed over an angle of about 180° and meshing with the stationary toothed segment 10 mounted on the arm 8 and with respect to which the arm 7 is swingable. Hence, movement of the arm 7 in the counterclockwise sense about its shaft 39 (FIG. 1) will correspondingly rotate the pickup head 4 about its pivot 12 in the counterclockwise sense (arrow D) through 180° and position the articles for engagement by the gripper device 5.

From FIG. 2, it can be seen that the pickup head 4 comprises a piston 13 whose piston rod 13a has a head 13b retained in a recess of a guide and support plate 17 by a securing ring 17a and bolts 17b. The guide and support plate 17 carries the gear segment 9 and is journaled on the shaft 12 not seen in FIG. 2. The piston 13 is formed with the usual sealing cups 18 effective in each of the chambers of an axially shiftable double-acting cylinder 14 which, in turn, is anchored to the plate 16 by a locking nut 16a.

Figure 4:
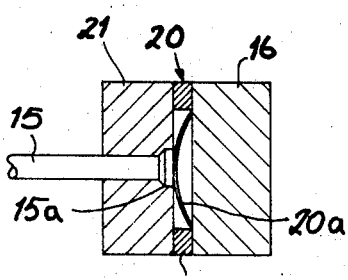
FIG. 4 is a detail view, in axial cross-section, of the spring backing the anchor pin of the pickup head of FIG. 2.

The support plate 16 of the pickup head 4, shown to be designed to remove two articles in side-by-side relationship from each mold, carries a plurality of anchor pins 15 associated with each article. The anchor pins 15 have head 15a (FIGS. 2 and 4) retained by a holding block 21 and a bolt 21a on the plate 16. A leaf or disk-spring assembly 20 is disposed between each anchor pin 15 and the plate 16 as shown in FIG. 4. The spring 20a is here shown to be of the plate-spring type and to be interposed between the head 15a of each anchor pin 15 and the confronting face of plate 16 while the spring compartment is surrounded by spacers 20b.

The anchor pins 15 are guided in sleeves 22 of the support plate 17 and are formed at their free ends with barbs 23 designed to lodge forcefully in the synthetic-resin material of the lost head 24 of the blow-molded articles. Beyond the face of plate 17, the guide sleeves 22 extend at 25 in the direction of the articles and are formed internally with outwardly divergent conical recesses 26 (see FIGS. 2 and 6) which engage the solid plastic material 27 of the article and provide firm connections between the pickup head and the articles.

The gripper mechanism shown in FIGS. 2 and 3 at 5 comprises a pair of opposing gripper jars 28 having symmetrical cutouts 29 conforming to the cross-section of the lost head 24 of the respective article to be clamped therein. The gripper jaws 28 are displaceable transversely to the pins 15 as represented by arrows E and F, i.e. toward and away from one another, by double-acting cylinders 45 and 46 connected by links 47 and 48 with the guide sleeves 49 and 50 of these jaws. The guide sleeves 49 and 50 slidably support the jaws on a shaft 51 which, in turn, is mounted swingably in a pair of slides 52 shiftable along a pair of rails 30 as represented by arrow G (FIG. 1) toward and away from the transport means 6. The slides 52 form pivots with pivot shafts represented at 53 allowing limited angular movement between the gripper jaws 28 and the rails 30 from the obtuse angle of the device illustrated at H for the upper position of the grips (in which the articles are initially engaged) to a right angle as represented in the lower extreme position J (FIG. 1) wherein the articles are to be discharged. Movement of shaft 51, slides 52 and the gripper jaws 28 along the rails 30 is effected by arms 54 seen in FIG. 3 but represented in dot-dash lines in FIG. 1, the arm 54 being articulated to the carriages 52 by links 55. Arms 54 are swingably mounted on the shaft 56 which has a cam follower 57, some of the positions of which are shown in FIG. 1.

The transport means 6 comprises an endless chain 31 having pockets 31a adapted to receive the articles 1 and separated by partitions 32 which entrain the articles along a transport path represented by arrow K, the chain 31 passing over a sprocket wheel whose shaft can be seen at 60. A rotary-ramp cam 61 engages the sprocket's teeth and is rotated as represented by arrow L via a coupling 62 with the cam shaft 33. A cam follower 63 also coordinates with this cam shaft to swing an arm 64 (FIG. 1) which is connected by a link 65 to the lever arm 66 of arm 7, thereby swinging the pickup head 4 in the cadence of rotation of the cam shaft 33. The latter is coupled (dot-dash line 68) with the turntable 3 at a ratio determined by the number of molds on the turntable to cycle the mold-emptying system upon the entry of each mold to the mold-emptying station.

In FIG. 5, we have shown a turntable 3 which comprises a pair of plates 3′, 3″, spanned by guide bars 2a and 2b of each mold assembly 2. Each assembly further includes an upper mold half 2′ and a lower mold half 2″ which are shiftable parallel to the axis of shaft 11 by double-acting cylinders 2c and 2d of hydraulic or pneumatic type. Fluid lines 2e connect the cylinders 2c and 2d with a distributing-valve programmer 80 which is cycled by the cam shaft 33 as represented by dot-dash line 81, this programmer also being connected to the cylinders 45 and 46 as represented by the lines 82 and to the cylinder 14 (lines 83). A rubber bumper 19 forms a shock absorber between the piston and the cylinder of the pickup head.

In operation, the turntable 3 is rotated continuously and carries the blow-molding molds 2 successively to the mold-emptying station, each mold forming two articles. As has been noted earlier, the filling of the molds with the thermoplastic strip and the blowing thereof is also carried out continuously. The arm 7, the pickup head 4, the gripper means 5, the transport mechanism 6 are operated synchronously with the movement of the turntable as will be apparent hereinafter, via the programming arrangement 33, 80.

Figure 7:
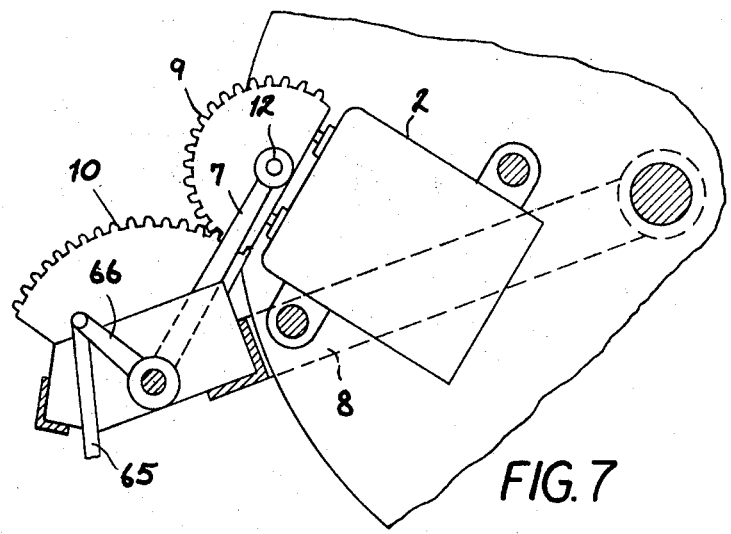

As a mold 2 is rotated into the mold-emptying station, and after the positioning of the pickup head 4 in its starting position B at the end of the previous cycle, the movement of the mold 2 in the clockwise sense drives the articles 1 onto the anchor pins 15 as a result of the rotation of the turntable (FIG. 7). The pickup head 4 and arm 8 are then entrained angularly with the turntable in the same sense and with the identical angular velocity while cylinders 2c and 2d are energized to open the mold by separation of the mold halves 2′, 2″ (FIG. 5).

Figure 8:
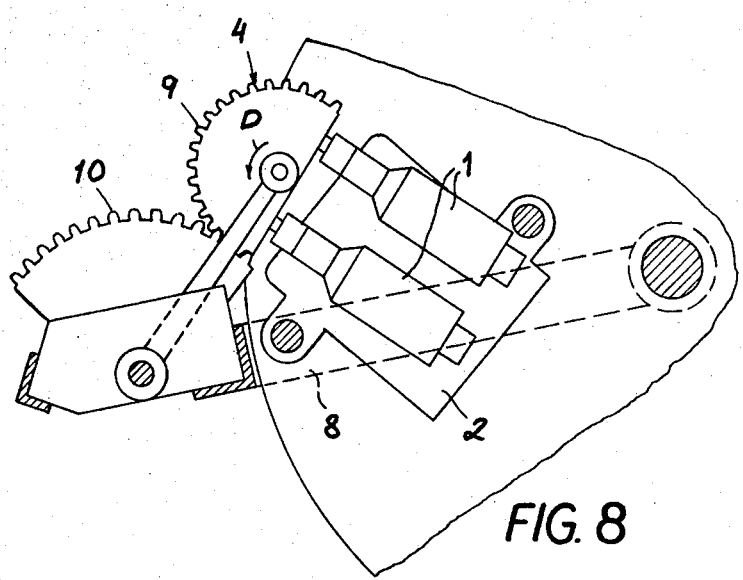

Continued rotation of the turntable beyond the allowable stroke $\varphi$ of the arm 8 (FIG. 1) and concurrent rotation of the cam shaft 33 swings the arm 7 in the counterclockwise sense (arrow M in FIG. 1) while the meshing of the toothed segment 9 with segment 10 cause a counterclockwise rotation of the head 4 (arrow D) and the articles 1 begin to clear the mold as shown in FIG. 8 in which the top mold half has been removed.

With further uninterrupted rotation (as shown in FIG. 9 in which the next mold 2 is seen being brought into the region of the mold-emptying station), the head 4 continues to swing about its shaft 12 until it has been rotated through 180° while arm 7 swings to its other extreme position C (FIG. 1) in which it halts temporarily.

Cylinders 45 and 46 are actuated via programmer 80 to clamp the jaws 28 about the lost head 24 of the articles 1 to produce the position of the assembly illustrated at H in FIG. 1. Cam shaft 33 continues its rotation to retract arm 7 and after withdrawal of the pins 15 from the gripped articles 1. To this end, programmer 80 supplies fluid under pressure to the upper compartment of cylinder 14, thereby driving the plate 16 in the direction of arrow N and retracting the pins 15 into the sleeves 25. When the pins have been retracted, the head 4 swings about its shaft 12 to its original position as the arm 7 returns to position B and fluid is supplied to the other chamber of cylinder 14, thereby allowing the pins to be driven into a further pair of articles.

During the return stroke of head 4, the cam shaft 33, via follower 57, pivot 56 and a lever 54, draws the slides 52 downwardly (arrow G) after swinging the clamping jaws 28 in the counterclockwise sense about shaft 51. At its lower position J, cylinders 45 and 46 are reversed to open the clamping jaws and release the articles into the pockets 31a of the conveyor 31 which is stepped by a distance corresponding to two articles as cam 33 returns the jaws 28 to their position shown at H in FIG. 1. The gripper 5 is thus prepared to receive another pair of hollow articles.

The improvement described and illustrated is believed to admit of many modifications within the ability of persons skilled in the art, all such modifications being considered within the spirit and scope of the invention except as limited by the appended claims.

We claim:

1. In combination with a continuously driven turntable provided with a plurality of openable molds adapted to form respective synthetic-resin articles upon the introduction of synthetic-resin materials into said molds, an article-removal and transport apparatus comprising a pickup head engageable with the articles of successive molds upon their entrainment by said turntable past a mold-emptying station;

mounting means supporting said pickup head for movement in the sense of rotation of said turntable and at the rate of rotation thereof over at least a limited angular stroke upon each engagement of said pickup head with an article of a mold displaced past said station;

a mechanism including said head for shifting the articles engaged thereby out of the molds; and transport means engaging the articles transferred out of said molds by said pickup head for further displacement of said articles.

2. The combination defined in claim 1 wherein said mounting means includes a first arm swingable about the axis of rotation of said turntable, and a second arm articulated to said first arm and carrying said head.

3. The combination defined in claim 2 wherein said mechanism includes a nonrotatable gear sector centered on the articulation axis of said second arm, said pickup head including a rotatable gear sector meshing with said nonrotatable gear sector for rotation of said pickup relative to said second arm upon swinging movement thereof between a first limiting position proximal to said turntable and a second limiting position distal therefrom about an axis parallel to the axis of rotation of said turntable.

4. The combination defined in claim 1 wherein said pickup head comprises at least one anchor pin adapted to be thrust into an article received in a mold passing said station, and a piston-and-cylinder arrangement coupled with said pin for retracting same to release said article to said transport means.

5. The combination defined in claim 4, further comprising a spring interposed between said pin and said piston-and-cylinder arrangement.

6. The combination defined in claim 4, further comprising a guide sleeve on said pickup head slidably receiving said pin, said pin being formed with a barb adapted to anchor the articles to the pin.

7. The combination defined in claim 6 wherein said sleeve has an extension projecting toward said barb and formed with an outwardly widening conical recess opening in the direction thereof.

8. The combination defined in claim 1 wherein said mechanism includes a pair of gripper jaws shiftable transversely to the article carried by said head and engageable therewith for stripping said article from said head, and means for shifting said jaws toward and away from one another.

9. The combination defined in claim 8 wherein said jaws are contoured to conform to the configuration of said articles.

10. The combination defined in claim 8 wherein said mechanism further comprises a linear guide rail carrying said jaws and pivot means for swingably supporting said jaws relative to said rail.

11. The combination defined in claim 10 wherein said transport means includes an endless chain having pockets receiving said articles and spaced apart by a distance corresponding to the spacing between articles delivered to said pockets.

12. The combination defined in claim 1, further comprising common cam means operatively connected to said pickup head, said mounting means, said mechanism and said transport means for cycling same in the cadence of advance of said molds to said station by said turntable.

References Cited

UNITED STATES PATENTS

| | | | |
|---|---|---|---|
| 1,989,977 | 2/1935 | Galson | 198—33R4 |
| 3,166,177 | 1/1965 | Laverty | 198—33(R4) |
| 3,332,109 | 7/1967 | Fischer | 18—5(BR) |

H. A. KILBY, JR., Primary Examiner

U.S. Cl. X.R.

198—33